US008576848B2

(12) United States Patent
Saad et al.

(10) Patent No.: US 8,576,848 B2
(45) Date of Patent: Nov. 5, 2013

(54) SCALABLE MULTIPROTOCOL LABEL SWITCHING (MPLS) BASED NETWORKS

(75) Inventors: Samir Saad, Ocean, NJ (US); Han Q. Nguyen, Marlboro, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

(21) Appl. No.: 12/885,168

(22) Filed: Sep. 17, 2010

(65) Prior Publication Data

US 2012/0069847 A1 Mar. 22, 2012

(51) Int. Cl.
*H04L 12/28* (2006.01)
*H04L 12/56* (2011.01)

(52) U.S. Cl.
USPC .......................................... 370/392

(58) Field of Classification Search
None
See application file for complete search history.

(56) References Cited

U.S. PATENT DOCUMENTS

| | | | |
|---|---|---|---|
| 6,363,319 B1 * | 3/2002 | Hsu .............................. | 701/533 |
| 7,417,950 B2 | 8/2008 | Hofmeister et al. | |
| 7,460,481 B2 | 12/2008 | Vasseur et al. | |
| 7,512,063 B2 | 3/2009 | Vasseur et al. | |
| 7,515,529 B2 | 4/2009 | Vasseur et al. | |
| 7,649,834 B2 * | 1/2010 | Badat et al. ................... | 370/216 |
| 7,734,745 B2 | 6/2010 | Gloe | |
| 7,936,780 B1 * | 5/2011 | Kompella ..................... | 370/466 |
| 2007/0030852 A1 * | 2/2007 | Szczesniak et al. ......... | 370/392 |
| 2007/0086429 A1 | 4/2007 | Lawrence et al. | |
| 2009/0003350 A1 | 1/2009 | Guichard et al. | |
| 2009/0103538 A1 | 4/2009 | Yoshimi | |
| 2009/0141632 A1 | 6/2009 | Lawrence et al. | |
| 2010/0166001 A1 | 7/2010 | Uttaro et al. | |

OTHER PUBLICATIONS

R. Callon, "Use of OSI IS-IS for Routing in TCP/IP and Dual Environments," IETF RFC 1195, Dec. 1990, 84 pages.
K. Varadhan, "BGP OSPF Interaction," IETF RFC 1403, Jan. 1993, 14 pages.
J. Moy, "OSPF Version 2," IETF RFC 2328, Apr. 1998, 245 pages.
E. Rosen, "BGP/MPLS VPNs," IETF RFC 2547, Mar. 1999, 25 pages.
Andersson et al., "LDP Specification," IETF RFC 3036, Jan. 2001, 91 pages.
Rekhter et al., "Carrying Label Information in BGP-4," IETF RFC 3107, May 2001, 9 pages.
Rekhter et al., "A Border Gateway Protocol 4 (BGP-4)," IETF RFC 4271, Jan. 2006, 103 pages.

(Continued)

*Primary Examiner* — Ayaz Sheikh
*Assistant Examiner* — Blanche Wong
(74) *Attorney, Agent, or Firm* — Hanley, Flight & Zimmerman, LLC

(57) ABSTRACT

Example scalable multiprotocol label switching (MPLS) based networks, and methods, apparatus and articles of manufacture to implement the same are disclosed. A disclosed example method includes determining at an area border router (ABR) an OSPF metric representing a cost associated with transporting data between a provider edge router (PER) and the ABR within a non-zero OSPF area, replacing at the ABR a first MPLS label included in a BGP message received from the PER with a second MPLS label associated with the PER and assigned by the ABR, replacing at the ABR a next-hop attribute included in the BGP message with a value representing a loopback address of the ABR, updating at the ABR a route cost attribute included in the BGP message to include the OSPF metric, and re-advertising from the ABR the modified BGP message into an OSPF area 0.

20 Claims, 4 Drawing Sheets

(56) References Cited

OTHER PUBLICATIONS

Rosen et al., "BGP/MPLS IP Virtual Private Networks (VPNs)," IETF RFC 4364, Feb. 2006, 47 pages.

Andersson et al., "LDP Specification," IETF RFC 5036, Oct. 2007, 136 pages.

Syed Faraz Shamin, "Understanding Redistribution of OSPF Routes into BGP," Cisco Systems, Inc., Document ID 5242, Updated Aug. 10, 2005, 11 pages.

Mohapatra et al., "The Accumulated IGP Metric Attribute for BGP," May 8, 2009, 13 pages.

Juniper Networks, Inc., "OSPF and BGP/MPLS VPNs," retrieved online Jun. 29, 2010, 9 pages.

* cited by examiner

SCALABLE MULTIPROTOCOL LABEL SWITCHING (MPLS) BASED NETWORKS

FIELD OF THE DISCLOSURE

This disclosure relates generally to multiprotocol label switching (MPLS) based networks, and, more particularly, to scalable MPLS-based networks, and methods, apparatus and articles of manufacture to implement scalable MPLS-based networks.

BACKGROUND

The size and scale of MPLS-based IP networks and other IP networks, in general, continue to rapidly increase. Example reasons for the increases include fast growth of existing services, support for new and emerging services, and/or mergers and acquisitions. An example global MPLS-based IP network includes multiple United States networks and connectivity over most of the world including Canada, the Europe, Middle East and Africa (EMEA) region, the Asia Pacific (AP) region, and the Caribbean and Latin America (CALA) region.

DETAILED DESCRIPTION

Example scalable multiprotocol label switching (MPLS) based IP networks, and methods, apparatus and articles of manufacture to implement scalable MPLS-based networks are disclosed. A disclosed example method includes determining at an area border router (ABR) an open shortest path first (OSPF) metric representing a cost associated with transporting data between a provider edge router (PER) and the ABR within a non-zero OSPF area of a hierarchical OSPF network, replacing at the ABR a first MPLS label included in a border gateway protocol (BGP) message received from the PER with a second MPLS label associated with the PER and assigned the ABR, replacing at the ABR a next-hop attribute included in the BGP message with a value representing a loopback address of the ABR, updating at the ABR a route cost attribute included in the BGP message to include the OSPF metric, and re-advertising from the ABR the modified BGP message into an OSPF area 0 of the hierarchical OSPF network.

A disclosed example area border router includes an OSPF engine to determine an OSPF metric representing a cost associated with transporting data between a PER and the ABR within a non-zero OSPF area of a hierarchical OSPF network and a BGP engine. A disclosed example BGP engine to modify a BGP message received from the PER by replacing a first MPLS label included in the BGP message with a second MPLS label associated with the PER and assigned by the ABR, replacing a next-hop attribute included in the BGP message with a value representing a loopback address of the ABR, and updating a route cost attribute included in the BGP message to include the OSPF metric, and to re-advertise the modified BGP message into an OSPF area 0 of the hierarchical OSPF network.

Example scalable MPLS-based networks described herein appear to customers as seamless networks that offer the same level of service regardless of from where the customer accesses the networks and support shortest path routing between source and destination PERs even when the source and destination PERs are located in different regions, areas, domains or sub-domains. In the disclosed examples, OSPF and label distribution protocol (LDP) database sizes are significantly reduced compared to those in traditional MPLS-based networks.

Figure 1:
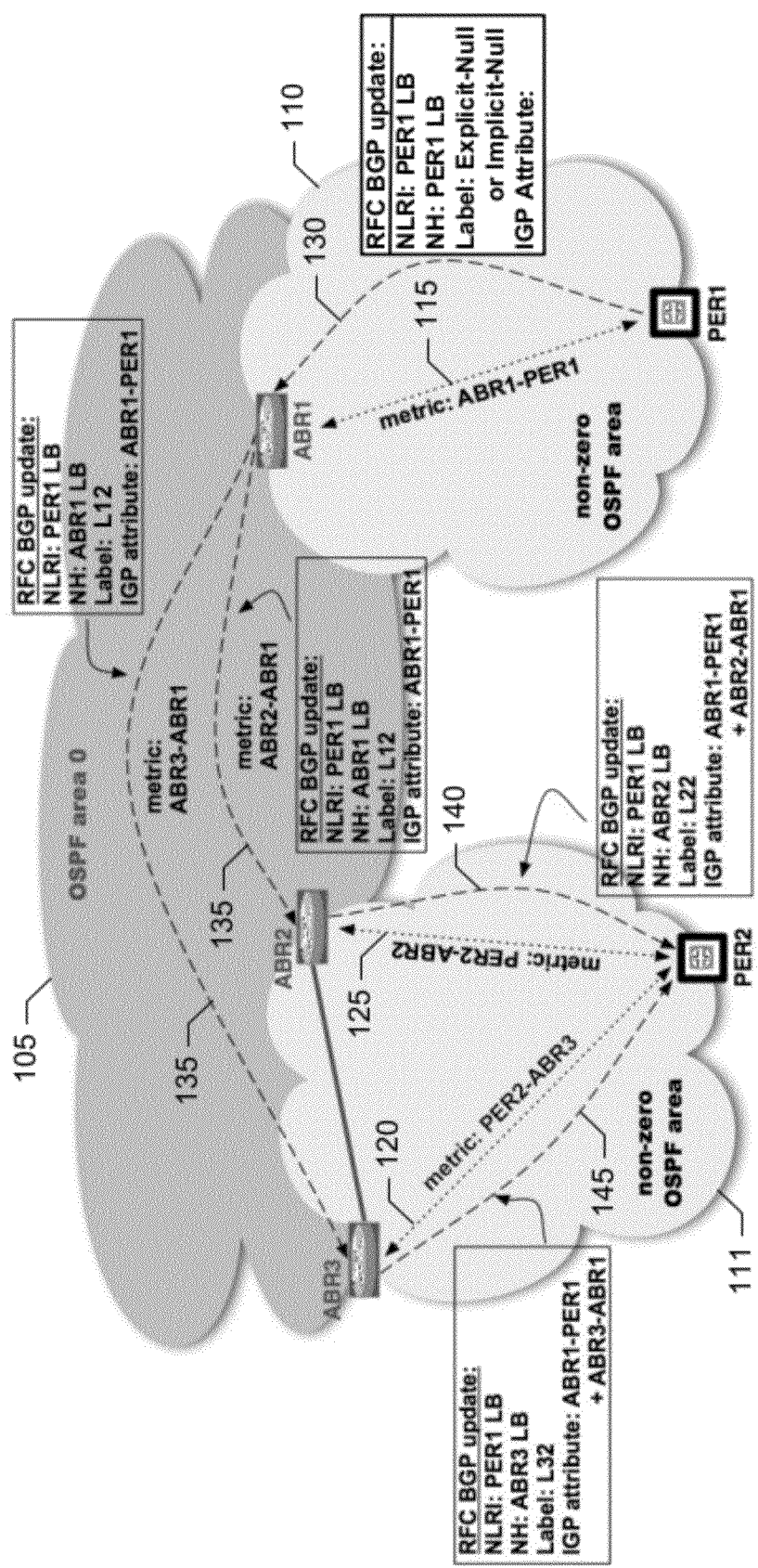
FIG. 1 is a schematic illustration of an example scalable MPLS-based network implemented in accordance with the teachings of this disclosure.

FIG. 1 illustrates an example scalable MPLS-based communication system 100. The example scalable MPLS-based communication system 100 of FIG. 1 is implemented using a hierarchical OSPF architecture as defined or described in any past, present and/or future standard and/or recommendation such as Internet Engineering Task Force (IETF) Request for Comment (RFC) 2328, which is hereby incorporated by reference in its entirety. The example communication system 100 uses link-state advertisements (LSA) to distribute routing information and/or route selection criteria as defined or described in any past, present and/or future OSPF standard and/or recommendation such as IETF RFC 2328. However, other protocol(s) may be used to distribute and/or determine link state and link cost information. Example information that may be included in an OSPF LSA include, but are not limited to, attached interfaces and route selection metrics.

The example communication system 100 of FIG. 1 implements a two-level OSPF hierarchy. A first or backbone OSPF level of the communication system 100 is referred to herein as "OSPF area 0" 105. Additional networks at a second or lower level of the communication system 100 are referred to herein as "non-zero OSPF areas" and are communicatively coupled to each other via the example OSPF area 0 105. While the example communication system 100 of FIG. 1 includes one OSPF area 0 105, and two non-zero OSPF areas 110 and 111 configured at the same level of hierarchy of the OSPF routing protocol, other example communication systems may include any number of non-zero OSPF areas at the same or different levels, and/or more than one OSPF area 0. Each of the example OSPF areas 105, 110 and 111 of FIG. 1 implement a respective network having any number and/or type(s) of routers connected via any number and/or type(s) of communication path(s) and/or topology(-ies).

Customer edge routers (CERs) (not shown) connect to the communication system 100 via PERs of the non-zero OSPF areas 110 and 111, two of which are designated at (PER1 and PER2). As used herein, a "provider edge router" (PER) refers to a router implemented at the edge of a service provider's network that is communicatively coupled, via one or more communication paths but without any intervening router, to a CER implemented at the edge of a customer's network. More than one CER may be communicatively coupled to any of the example PERs (e.g., PER1 and PER2). Further, a CER may be communicatively coupled to more than one PER. As used herein, the term "area border router" (ABR) refers to a router configured to communicatively couple an OSPF area 0 to at least one non-zero OSPF area. Thus, as shown in FIG. 1, ABRs, which have multiple interfaces and participate in and/or are configured to operate in multiple areas, communicatively couple the non-zero OSPF areas 110 and 111 to the OSPF area 0 105. Three example ABRs (e.g., ABR1-ABR3) are depicted in FIG. 1. The example ABR1 communicatively couples the non-zero OSPF area 110 to the OSPF area 0 105, and ABR2 and ABR3 communicatively couple the non-zero OSPF area 111 to the OSPF area 0 105. While the example PERs (e.g., PER1 and PER2) are depicted as coupled to the ABRs (e.g., ABR1-ABR3), they may be communicatively coupled via any number and/or type(s) of intervening or intermediate router(s) and/or link(s). Further, an ABR may be configured into more than one non-zero OSPF area.

Figure 2:
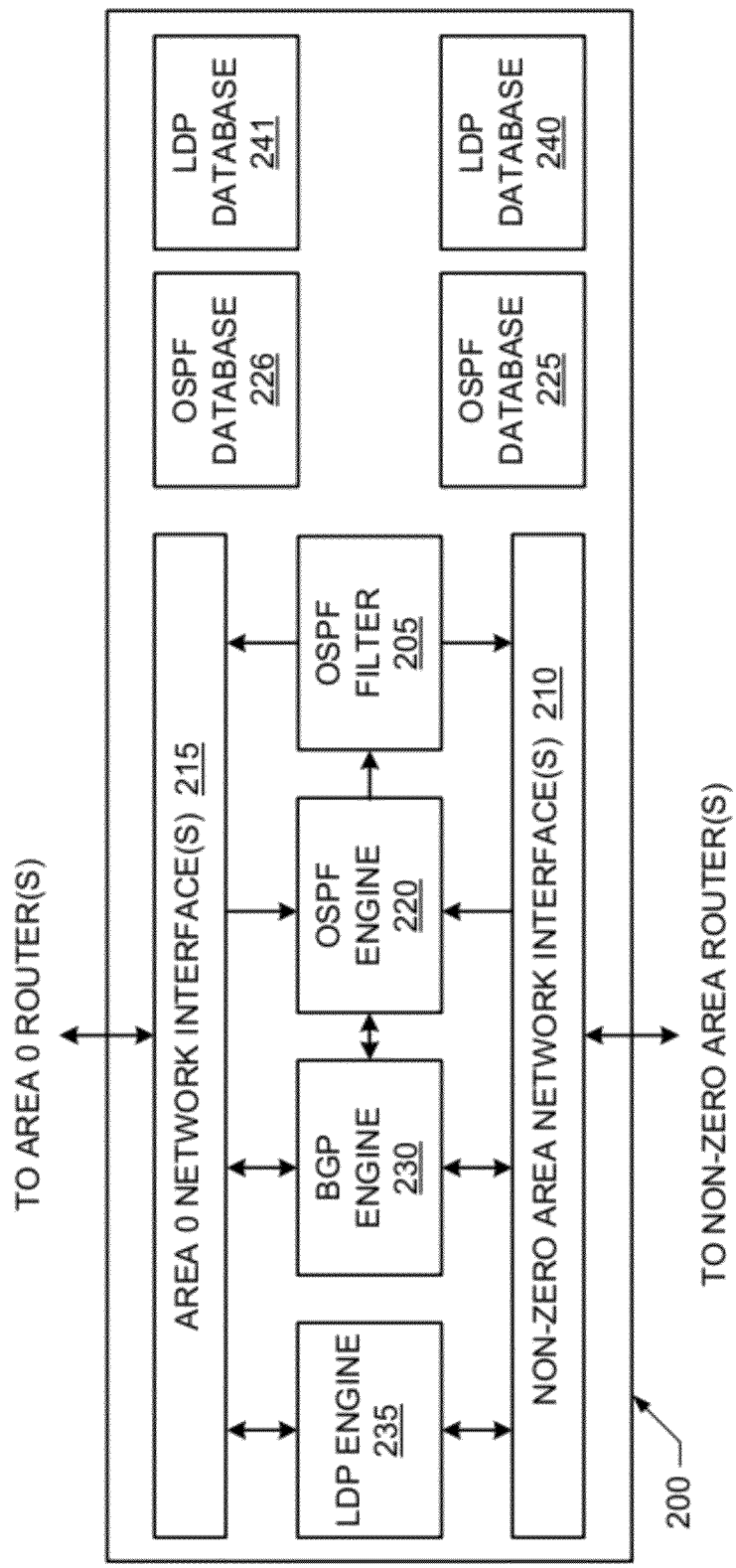
FIG. 2 illustrates an example manner of implementing any of the example area border routers (ABRs) of FIG. 1.

Each of the example ABRs (e.g., ABR1-ABR3) of FIG. 1 maintains separate OSPF databases 225, 226 (FIG. 2). An OSPF database maintained by an ABR contains information for a particular area in which the ABR is configured. For instance, example ABR1, which is an ABR between OSPF area 0 105 and the non-zero OSPF area 110, maintains a database OSPF information for OSPF area 0 105 (e.g., in the OSPF database 225) and a database OSPF information for the non-zero OSPF area 110 (e.g., in the OSPF database 226). Likewise, ABR2 and ABR3, which are area border routers between OSPF area 0 105 and the non-zero OSPF area 111, each maintains separate database OSPF information for OSPF area 0 105 (e.g., in a respective OSPF database 225) and for the non-zero OSPF area 111 (e.g., in a respective OSPF database 226). Because routers configured in a particular OSPF area should share the same information to enable consistent and correct routing decisions, they typically have identical OSPF databases for that OSPF area. For instance, ABR1-3 are configured in the same OSPF area 0 105 and, therefore, the OSPF databases 225 maintained by ABR1-3 are typically identical. Further, because ABR2 and ABR3 are both are configured in the non-zero OSPF area 111, the OSPF databases 226 maintained by ABR2 and ABR3 are typically identical.

While the illustrated example of FIG. 1 does not depict an ABR configured in more than one non-zero OSPF area, an ABR that is configured in more than one non-zero OSPF area maintains a separate OSPF database 226 for each non-zero OSPF area.

Each of the example OSPF areas 105, 110 and 111 of FIG. 1 operate as separate or independent OSPF areas. The OSPF database 225 that an ABR maintains for OSPF area 0 105 includes information derived from (A) Type 1 router LSAs generated by each router configured in the OSPF area 0 105 describing the information of all the interfaces on the router that are configured in the OSPF area 0 105, and (B) Type 3 Summary LSAs summarizing the information of each individual interface configured in the non-zero OSPF areas. Each of ABR1-3 implement an OSPF filter 205 (FIG. 2) that prevents Type 3 Summary LSAs from being injected from one OSPF area into another OSPF area. The example OSPF filter 205 of FIG. 2 prevents Type 3 Summary LSAs from being injected into the OSPF area 0 105. Thus, the OSPF database 225 maintained by an ABR includes Type 1 router LSAs but does not include Type 3 Summary LSAs.

The OSPF database 226 that an ABR maintains for each non-zero OSPF area includes information derived from (A) Type 3 Summary LSAs summarizing the information of each individual interface configured in the OSPF area 0 105 and (B) Type 3 Summary LSAs summarizing the information of each individual interface configured in a non-zero OSPF area that is different from the non-zero OSPF area for which the ABR maintains the particular OSPF database 226. The example OSPF filter 205 of FIG. 2 prevents Type 3 Summary LSAs from being injected from one OSPF area into another OSPF area. In some examples, an ABR may not maintain an OSPF database 226.

As the routers PER1, PER2 and ABR1-ABR3 accumulate link-state information via OSPF, they use any number and/or type(s) of shortest path first (SPF) algorithm(s) to calculate route costs (e.g., a route metric or a route cost) that may be used to select a particular route (e.g., the shortest path, the lowest delay path, etc.) to other routers within a particular area. For instance, the example ABR1 calculates the OSPF metric ABR1-PER1 115 within the non-zero OSPF area 110 (e.g., a route cost metric) associated with transporting or routing data from ABR1 to PER1, and the example PER2 calculates the OSPF metrics PER2-ABR3 120 and PER2-ABR2 125 (within the non-zero OSPF area 111) that is associated with transporting or routing data to each of ABR2 and ABR3, respectively. The example ABR2 calculates the OSPF metric ABR2-ABR1, within the OSPF area 0 105, that is associated with transporting or routing data from ABR2 to ABR1, and the example ABR3 calculates the OSPF metric ABR3-ABR1, within the OSPF area 0 105, that is associated with transporting or routing data from ABR3 to ABR1.

By sending, for example, BGP messages (e.g., a BGP route advertisement and/or a BGP update), each of the example PERs (e.g., PER1 and PER2) of FIG. 1 publish and/or export information concerning the CER(s) that are currently and/or actively communicatively coupled to the PERs. BGP route messages may be implemented in accordance with any past, present and/or future standard and/or recommendation such as IETF RFC 4271 and IETF RFC 4364, which are each hereby incorporated by reference in its entirety. BGP messages exchanged between PER1 and PER2 specify in the exchanges in the direction from PER1 to PER2 the next-hop information, a PER1 address which is typically a loopback interface address PER1 LB that can used when routing or transporting data from a source (e.g., a CER communicatively coupled to PER2) to a particular destination (e.g., a CER communicatively coupled to PER1). The BGP messages exchanged between PER1 and PER2 specify in the exchanges in the direction from PER2 to PER1 the next-hop information, a PER2 address which is PER2 LB that can be used when routing or transporting data from a source (e.g., a CER communicatively coupled to PER1) to a particular destination (e.g., a CER communicatively coupled to PER2). In some examples (e.g., a large IP network), the example communication network 100 of FIG. 1 includes any number of route reflectors, route servers, intelligent route reflectors and/or intelligent route service control points (not shown) to facilitate scaling and/or efficient sharing of route information.

Examples disclosed herein enhance or augment the BGP protocol to distribute labels as specified in IETF RFC 3107 and to carry IGP metrics. IETF RFC 3107 is hereby incorporated by reference in its entirety. The capability to carry IGP metrics in BGP messages replaces the traditional procedures of exchanging IGP metrics using IGP protocols such as OSPF and Integrated IS-IS with the objective of reducing the size of the IGP databases (e.g., OSPF databases) in the continuous rapid growth of IP networks. The capability to distribute labels for PER/32 interface addresses in BGP replaces the traditional LDP protocol as a mechanism for label distribution associated with PER/32 interface addresses with the objective of reducing the size of LDP databases as an MPLS-based IP network increases in size.

In the example BGP protocol message advertisement of PER1 130 of FIG. 1, the PER1 has the option to signal to the ABR1 in the label field either an implicit-null label request or an explicit-null label request. The labels included in a BGP message may be determined in accordance with any past, present and/or future standard and/or recommendation such as IETF RFC 3107. In some examples, ABR1 is not be directly connected to PER1. Therefore a label distribution protocol, in accordance with any past, present and/or future standard and/or recommendation, can be used within the non-zero OSPF area 110 for ABR1 to receive from its downstream routers along paths to PER1 labels assigned locally by these downstream routers to reach PER1 LB. The example ABR1 selects the label that it receives from the downstream router which is along the shortest path to PER1. In the illustrated example of FIG. 1, LDP, (e.g., as specified in IETF RFC 3036) is configured within the non-zero OSPF area 110.

Data packets transmitted by ABR1 to PER1 will have an additional label in their label stack when PER1 has signaled to ABR1 a request for an explicit-null label. In the case of implicit-null label request, ABR1 is the penultimate BGP hop router in relation to PER1 and would pop the label, and hence there is one less label than in the case of an explicit-null label request.

Each of the example OSPF areas 105, 110 and 111 of FIG. 1 operates as separate or independent LDP areas. Accordingly the LDP databases 240, 241 (FIG. 2) associated with a particular OSPF area 105, 110, 111 only include labels for the LB addresses within that area. Each of the example ABRs (e.g., ABR1-ABR3) maintains separate LDP databases 240, 241. An LDP database maintained by an ABR contains information for a particular OSPF area in which the ABR is configured. For example, ABR1, which is an ABR between the OSPF area 0 105 and the non-zero OSPF area 110, maintains a database of LDP information for the OSPF area 0 105 (e.g., in the LDP database 240) and a database of LDP information for the non-zero OSPF area 110 (e.g., in the LDP database 241). Likewise, ABR2 and ABR3, which are ABRs between the OSPF area 0 105 and the non-zero OSPF area 111, each maintains separate database of LDP information for the OSPF area 0 105 (e.g., in a respective LDP database 240) and for the non-zero OSPF area 111 (e.g., in a respective LDP database 241).

When, for example, a BGP message 130 for loopback interface PER1 LB of PER1 is received at ABR1 from PER1, the example ABR1 creates a label binding entry for PER1 LB between an incoming label L12 and an outgoing label to reach PER1 LB. PER1 LB is known at ABR1 via both BGP and OSPF. The incoming label L12 is assigned by ABR1 to reach the PER1 LB interface and is included in the label field of BGP messages as specified in, for example, IETF RFC 3107 that re-advertise the PER1 LB interface into the OSPF area 0 105, as described in more detail below. The outgoing label that ABR1 uses to create the label binding is determined based on how ABR1 is configured to install the route to PER1 LB. The outgoing label used in the binding is the label that ABR1 receives via LDP from its downstream router along the shortest OSPF path to PER1 LB within non-zero OSPF area 110 in case ABR1 is configured to install the route to PER1 LB that it learns from OSPF. The outgoing label used in the binding is the label that ABR1 receives via BGP in case ABR1 is configured to install the route to PER1 LB that it learns from BGP. There are two cases to consider. The first case is to deal with the explicit-null label request in the incoming BGP message 130 advertised by PER1. In this first case, the outgoing label used in the binding includes a stack of two labels. ABR1 constructs an inner label with value of 0 per the explicit-null label request from PER1 and adds an outer label to reach PER1 LB. The outer label is the label that ABR1 receives via LDP from its downstream router along the path with the smallest OSPF cost to PER1. The second case is to deal with the implicit-null label request in the incoming BGP message 130. In this second case, the outgoing label used in the binding includes of a single label which is the label that ABR1 receives via LDP from its downstream router along the path with the smallest OSPF cost to PER1. ABR1 constructs a label that is immediately popped per the implicit-null label request and uses as label the LDP label to reach PER1 LB.

The example ABR1 of FIG. 1 modifies the BGP message 130 by (A) replacing the address in the field specifying the next hop for PER1 LB in the incoming message 130 with its own loopback interface address ABR1 LB, (B) replacing either the explicit-null label request or the implicit-null label request with a label L12 that is locally assigned by ABR1 for PER1 LB and (C) including in the Accumulated IGP (AIGP) attribute field the OSPF cost of 115 corresponding to the transport or routing of data from ABR1 to PER1. In the illustrated example of FIG. 1 the AIGP attribute field in the BGP message 130 was NIL (e.g., nothing or zero) so the AIGP metric is set equal to the OSPF metric ABR1-PER1 115. ABR1 can be configured to include the AIGP metric attribute into the re-advertised BGP message 135 to ABR2 and ABR3 if the incoming BGP message 130 does not contain the AIGP attribute field. An example format for carrying the route cost metrics as AIGP metrics within BGP messages is described in the IETF working document by Mohapatra et al. entitled "The Accumulated IGP Metric Attribute for BGP" and dated May 8, 2009, which is hereby incorporated by reference in its entirety. The example ABR1 re-advertises PER1's loopback interface PER1 LB into the OSPF area 0 105. The example modified BGP message 135 may be sent by ABR1 either to every ABR in the OSPF area 0 105 (e.g., ABR2 and ABR3) across BGP sessions established from ABR1 to every other ABR in the OSPF 0 105 or to route reflectors (not shown).

When the example BGP message 135 is received at ABR2, the example ABR2 creates, generates or forms a label binding entry for the PER1 LB interface between an incoming label L22 and an outgoing label to reach the PER1 LB interface. The incoming label L22 is assigned by ABR2 to reach the PER1 LB interface and is included in the label field of BGP messages as specified in, for example, IETF RFC 3107 that re-advertises the PER1 LB interface into the OSPF non-zero area 111, as described in more detail below.

The outgoing label that ABR2 uses to create the label binding may be, for example, determined as follows. The example ABR2 determines from the BGP messages that is receives from ABRs that are configured in the OSPF non-zero area 110 (e.g., the example BGP message 135) the ABR that is the next hop to reach the PER1 LB interface. While in FIG. 1, ABR1 is the only ABR configured in the OSPF non-zero area 110, typically more than one ABR would be configured in the OSPF non-zero area 110. In FIG. 1, the BGP message 135 that ABR2 receives from ABR1 contains the label L12 in its label field. For each BGP message received by ABR2 from an ABR in the OSPF non-zero area 100 re-advertising the PER1 LB interface, ABR2 computes the accumulated AIGP metric by adding (a) the OSPF cost from itself across the OSPF area 0 105 to the loopback interface of the ABR sending the BGP message to (b) the value in the AIGP metric attribute in that message. ABR2 selects as the next hop to reach the PER1 LB interface, the ABR in the OSPF non-zero area 110 associated with the smallest or shortest AIGP metric. The value of the AIGP metric received by ABR2 from an ABR in the OSPF non-zero area 110 is the OSPF cost to transport data from that ABR to the PER1 LB interface. The shortest or smallest accumulated AIGP computed by ABR2 represents the shortest or smallest OSPF cost to transport data from ABR2 to the PER1 LB interface.

ABR2 also receives LDP advertisements from its downstream routers along the paths across the OSPF area 0 105 to the loopback interface of each ABR that is configured in the OSPF non-zero area 110. Assuming that ABR2 selects ABR1 as the next hop to reach the PER1 LB interface (e.g., the computed accumulated AIGP metric associated with ABR1 is shorter or smaller than the computed accumulated AIGP metrics associated with any other ABR in the OSPF non-zero area 110), ABR2 selects the LDP label it receives from the downstream router along the path with the shortest cost to the ABR1 LB interface, which is according to ABR2's accumulated AIGP metric is the next hop to reach the PER1 LB interface.

ABR2 creates, forms or generates the label binding between the incoming label L22 by constructing an outgoing label stack by inserting the BGP label L12 it has received in the BGP message from ABR1 re-advertising the PER1 LB interface and inserting on top of that label the LDP label it has selected to reach the ARB1 LB interface.

When the example BGP message 135 is received at ABR2, the example ABR2 modifies the BGP message 135. The example ABR2 of FIG. 1 modifies the BGP message 135 by (A) replacing the next-hop ABR1 LB specified in the BGP with ABR2's loopback interface address ABR2 LB, (B) replacing the MPLS label L12 with a label L22 locally assigned by ABR2 for PER1 LB and (C) updating the AIGP attribute to include the OSPF route metric ABR2-ABR1 corresponding to the transport or routing of data between ABR2 and ABR1. In the illustrated example of FIG. 1, the updated AIGP metric is set equal to the sum of the route metric ABR1-PER1 and the route metric ABR2-ABR1. The example ABR2 then re-advertises PER1's loopback interface PER1 LB into the non-zero OSPF area 111 using the modified BGP message 140. The example modified BGP message 140 may be sent by ABR2 either to every PER in OSPF non-zero area 111 over individual BGP sessions established between ABR2 and every PER in the OSPF non-zero area 111 or to route reflectors (not shown).

When the example BGP message 135 is received at ABR3, ABR3 creates a label binding for the PER1 LB interface between an incoming label L32 and an outgoing label to reach the PER1 LB interface and is included in the label field of BGP messages as specified in, for example, IETF RFC 3107 that re-advertise the PER1 LB interface into the OSPF non-zero area 111, as described above in connection with ABR2. The outgoing label that ABR3 uses to create the label binding is determined, as described above in connection with ABR2.

The example ABR3 of FIG. 1 also receives and modifies the BGP message 135 forming and re-advertising a BGP message 145 in the non-zero OSPF area 111 directly or via a route reflector (not shown). The example BGP message 145 of FIG. 1 indicates: (A) the loopback address of ABR3 as the next-hop, (B) the label L32 that is locally assigned by ABR3 for PER1 LB, and (C) the IGB attribute is set equal to the sum of the route metric ABR1-PER1 and the route metric ABR3-ABR1.

The example PER2 of FIG. 1 receives and processes both of the example BGP messages 140 and 145. Based on the BGP messages 140 and 145, PER2 selects either ABR2 or ABR3 as the next hop when sending data to PER1. The example PER2 computes a sum of the PER2-ABR2 OSPF route metric 125 and the value of the AIGP attribute of the BGP message 140. For example, PER2 computes a first route metric S2=ABR1-PER1+ABR2-ABR1+PER2-ABR2, wherein ABR1-PER1, ABR2-ABR1, and PER2-ABR2 are OSPF metric values. The PER PER2 also computes a sum of the PER2-ABR3 OSPF route metric 120 and the value of the AIGP attribute of the BGP message 145. For example, PER2 computes a second route metric S3=ABR1-PER1+ABR3-ABR2+PER2-ABR3, wherein ABR1-PER1, ABR3-ABR2, and PER2-ABR3 are OSPF metric values. The example PER2 of FIG. 1 selects ABR2 as the next-hop when the route metric S2 is less than to the route metric S3, and selects ABR3 as the next-hop when the route metric S2 is greater than the route metric S3. When the route metrics S2 and S3 are equal, BGP best path selection algorithm is used. The example PER2 or FIG. 1 may be configured to load balance the traffic by selecting both ABR2 and ABR3 as next hops when sending data traffic to PER 1.

There are a number of unexpected and significant advantages realized in the example communication system 100 of FIG. 1 that enable the example communication system 100 to be efficiently scaled. The PERs in a given non-zero OSPF area need to only know about the loopback interface addresses of the ABR routers in their non-zero OSPF area. They do not need to know about the loopback interface addresses of the ABR routers in the OSPF area 0 105. For example, PER1 does not need to know about the loopback interface addresses of the ABRs (e.g., ABR2 and ABR3) in other non-zero OSPF areas (e.g., non-zero OSPF area 111). PER1 need only know about the loopback interface address of ABR1. Similarly, PER2 does not need to know about the loopback interface address of ABR1. PER2 need only know about the loopback interface addresses of ABR2 and ABR3. This significantly reduces size of the OSPF databases 225, 226 and the LDP databases 240, 241 in each of the OSPF areas 105, 110 and 111.

Further, a hierarchical MPLS structure is realized. An end-to-end label switched path (LSP) will include three segments: (1) a segment in an ingress OSPF non-zero area (e.g., ingress OSPF non-zero area 110 in an example of PER1 sending data traffic to PER2, or ingress OSPF non-zero area 111 in the example of PER2 sending data traffic to PER1), (2) a segment in the OSPF area 0 105, and (3) a segment in an egress OSPF non-zero area (e.g., egress OSPF non-zero area 110 in an example of PER2 sending data traffic to PER1, or egress OSPF non-zero area 111 in an example of PER1 sending data traffic to PER2). The MPLS hierarchy decouples the LDP in each OSPF from the LDP's in other areas. For example, the LDP in the non-zero OSPF area 110 is decoupled from the LDP in the non-zero OSPF area 111 and from the LDP in the OSPF area 0 105. This significantly reduces the size of the LDP databases 240, 241 in each of the OSPF areas 105, 110 and 111.

Further still, because the example BGP message 130 is modified as it propagates through the communication system 100, OSPF selection information in the form of the route cost (e.g., AIGP) attribute is updated (e.g., accumulated) and communicated without the need for each of the OSPF areas 105 and 111 to include the PER1 loopback interface PER1 LB in their OSPF databases 225, 226. Thus, end-to-end shortest path route selection may be performed with a substantially reduced OSPF database size.

FIG. 2 illustrates an example manner of implementing the example ABRs of FIG. 1. While any of the example ABRs (e.g., ABR1-ABR3) of FIG. 1 may be represented by the illustrated example of FIG. 2, for ease of the discussion, the ABR depicted in FIG. 2 will be referred to as ABR 200. To communicatively couple the example ABR 200 of FIG. 2 to other routers within a non-zero OSPF area (e.g., the example PER1 of the example non-zero OSPF area 110), the example ABR 200 includes any number and/or type(s) of non-zero area network interface(s) 210. To communicatively couple the example ABR 200 of FIG. 2 to other routers within an OSPF area 0 (e.g., ABR2 and/or ABR3 of the example OSPF area 0 105), the example ABR 200 includes any number and/or type(s) of area 0 network interface(s) 215. The example network interfaces 210 and 215 may be any type(s) of network interfaces including, but not limited to, electrical and/or optical based Ethernet, Frame Relay and/or asynchronous transfer mode (ATM) interfaces.

To implement OSPF, the example ABR 200 of FIG. 2 includes any type of OSPF engine 220. Based on, for example, LSA received via the network interfaces 210 and 215, the example OSPF engine 220 of FIG. 2 maintains OSPF databases for respective ones of the OSPF areas in which the ABR 200 is configured. In the example of FIG. 2, two OSPF databases 225 and 226 are shown and, thus, the example ABR 200 is configured into two OSPF areas. Among other things, the example OSPF engine 220 computes the OSPF metrics (e.g., the example metrics 115, 120 and 125 of FIG. 1) for each router to which the ABR 200 is communicatively coupled. The example OSPF engine 220 stores the computed OSPF metrics in appropriate ones of the example OSPF databases 225 and 226. OSPF information may be stored in the example OSPF databases 225 and 226 using any number and/or type(s) of data structures. The OSPF databases 225 and 226 may be implemented by any number and/or type(s) of volatile and/or non-volatile memory device(s), memory(-ies) and/or storage device(s). The example OSPF filter 205 of FIG. 2 prevents OSPF messages associated with one OSPF area from being distributed into other OSPF areas.

To implement BGP, the example ABR 200 of FIG. 2 includes any type of BGP engine 230. When a BGP messages is received from one OSPF area, the example BGP engine 230 modifies the BGP message and redistributes the modified BGP message into one or more other OSPF areas. The BGP engine 230 modifies the BGP message by (A) replacing the next-hop specified in the received BGP message with the loopback interface address of the ABR 200, (B) replacing the MPLS label in the received BGP message with a label assigned to the loopback address of the ABR 200 and (C) updating the route cost (e.g., AIGP) attribute of the received BGP message to include the OSPF route metric corresponding to the path via which the BGP message was received.

To implement LDP, the example ABR 200 of FIG. 2 includes any type of LDP engine 235. When LDP related messages are received from one OSPF area, the example LDP engine 235 updates the LDP database 240, 241 associated with that OSPF area. LDP information may be stored in the example LDP databases 240 and 241 using any number and/or type(s) of data structures. The LDP databases 240 and 241 may be implemented by any number and/or type(s) of volatile and/or non-volatile memory device(s), memory(-ies) and/or storage device(s). The example LDP engine 235 of FIG. 2 prevents LDP messages associated with one OSPF area from being distributed into other OSPF areas.

While an example manner of implementing the example ABRs (e.g., ABR1-ABR3) has been illustrated in FIG. 2, one or more of the elements, processes and/or devices illustrated in FIG. 2 may be combined, divided, re-arranged, omitted, eliminated and/or implemented in any other way. Further, the example OSPF filter 205, the example network interfaces 210 and 215, the example OSPF engine 220, the example databases 225, 226, 240 and 241, the example BGP engine 230, the example LDP engine 235 and/or, more generally, the example ABR 200 of FIG. 2 may be implemented by hardware, software, firmware and/or any combination of hardware, software and/or firmware. Thus, for example, any of the example OSPF filter 205, the example network interfaces 210 and 215, the example OSPF engine 220, the example databases 225, 226, 240 and 241, the example BGP engine 230, the example LDP engine 235 and/or the example ABR 200 could be implemented by the example process platform P100 of FIG. 4 and/or one or more circuit(s), programmable processsor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example OSPF filter 205, the example network interfaces 210 and 215, the example OSPF engine 220, the example databases 225, 226, 240 and 241, the example BGP engine 230, the example LDP engine 235 and/or the example ABR 200 are hereby expressly defined to include a tangible article of manufacture such as a tangible computer-readable medium storing the firmware and/or software. Further still, the example ABR 200 of FIG. 2 may include one or more elements, processes and/or devices in addition to, or instead of, those illustrated in FIG. 2, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 4. As used herein, the term non-transitory computer-readable medium is expressly defined to include any type of computer-readable medium and to exclude propagating signals.

Figure 3:
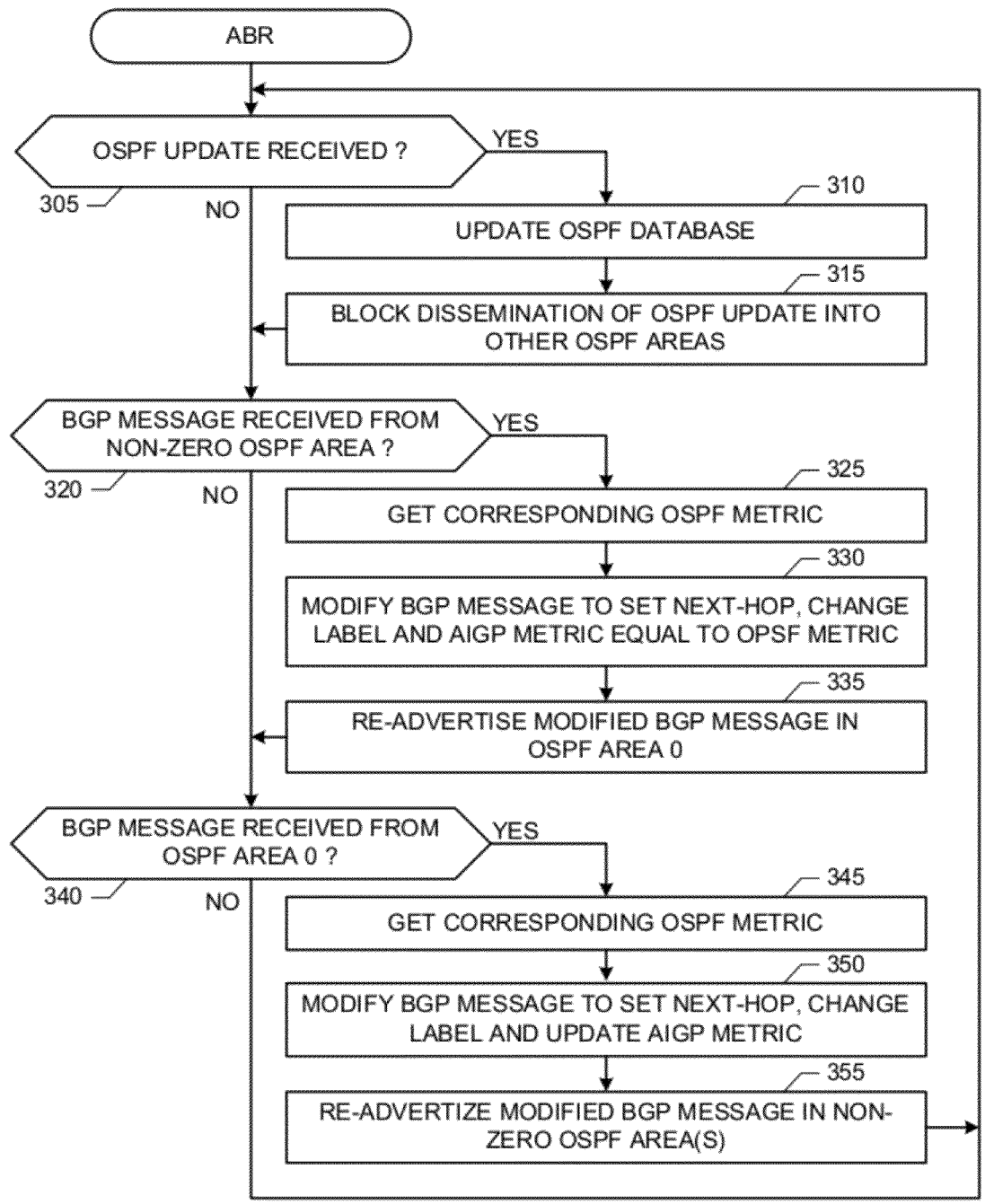
FIG. 3 is a flowchart representative of an example process that may be embodied as machine-accessible instructions and executed by, for example, one or more processors to implement any of the example ABRs of FIGS. 1 and 2.

A flowchart representative of an example process that may be embodied in machine-readable instructions and executed to implement an ABR (e.g., ABR1-ABR3 and/or ABR 200 of FIGS. 1 and 2) is shown in FIG. 3. A processor, a controller and/or any other suitable processing device may be used, configured and/or programmed to execute the example machine-readable instructions represented in FIG. 3. For example, the machine-readable instructions of FIG. 3 may be embodied in coded instructions stored on a tangible computer-readable medium. Machine-readable instructions comprise, for example, instructions that cause a processor, a computer and/or a machine having a processor to perform one or more particular processes. Alternatively, some or all of the example process of FIG. 3 may be implemented using any combination(s) of ASIC(s), PLD(s), FPLD(s), FPGA(s), discrete logic, hardware, firmware, etc. Also, some or all of the example process of FIG. 3 may be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, the blocks of any or all of the example process of FIG. 3 may be carried out sequentially and/or carried out in parallel by, for example, separate processing threads, processors, devices, discrete logic, circuits, etc.

The example machine-accessible instructions of FIG. 3 begin with the OSPF engine 220 determining whether an OSPF update (e.g., a LSA) was received (block 305). When an OSPF update is received (block 305), the OSPF engine 220 updates the OSPF database 220, 225 of the OSPF area 105, 110, 111 associated with the OSPF update (block 310). The example OSPF filter 205 prevents or blocks the received OSPF update from being sent or disseminated in other OSPF areas (block 315). Control then proceeds to block 320. If an OSPF update was not received (block 305), control proceeds to block 320.

The BGP engine 230 determines whether a BGP message was received from a non-zero OSPF area (block 320). When a BGP message is received from a non-zero OSPF area (block 320), the BGP engine 230 obtains the OSPF metric corresponding to the path via which the BGP message was received (block 325). The OSPF metric may be obtained directly from the associated OSPF database 225, 226 or via the OSPF engine 220. The BGP engine 230 modifies the received BGP message by (A) replacing the next-hop specified in the received BGP message with the loopback interface address of the ABR implementing the BGP engine 230, (B) replacing the MPLS label in the received BGP message with a label assigned to the loopback address of the corresponding ABR, and (C) updating the route cost (e.g., AIGP) attribute of the received BGP message to include the obtained OSPF metric (block 330). The BGP engine 230 re-advertises or distributes the modified BGP message into the OSPF area 0 105 (block 335). Control then proceeds to block 340. If a BGP message was not received from a non-zero OSPF area (block 320), control proceeds to block 340.

The BGP engine 230 determines whether a BGP message was received from the OSPF area 0 105 (block 340). When a BGP message is received from OSPF area 0 105 (block 340), the BGP engine 230 obtains the OSPF metric corresponding to the path via which the BGP message was received (block 345). The OSPF metric may be obtained directly from the associated OSPF database 225, 226 or via the OSPF engine 220. The BGP engine 230 modifies the received BGP message by (A) replacing the next-hop specified in the received BGP message with the loopback interface address of the ABR implementing the BGP engine 230, (B) replacing the MPLS label in the received BGP message with a label assigned to the loopback address of the ABR, and (C) updating the route cost (e.g., AIGP) attribute of the received BGP message to include the obtained OSPF metric (block 350). The BGP engine 230 re-advertises or distributes the modified BGP message into one or more non-zero OSPF areas (block 355). Control then returns to block 305. If a BGP message was not received from the OSPF area 0 105 (block 340), control returns to block 305.

Figure 4:
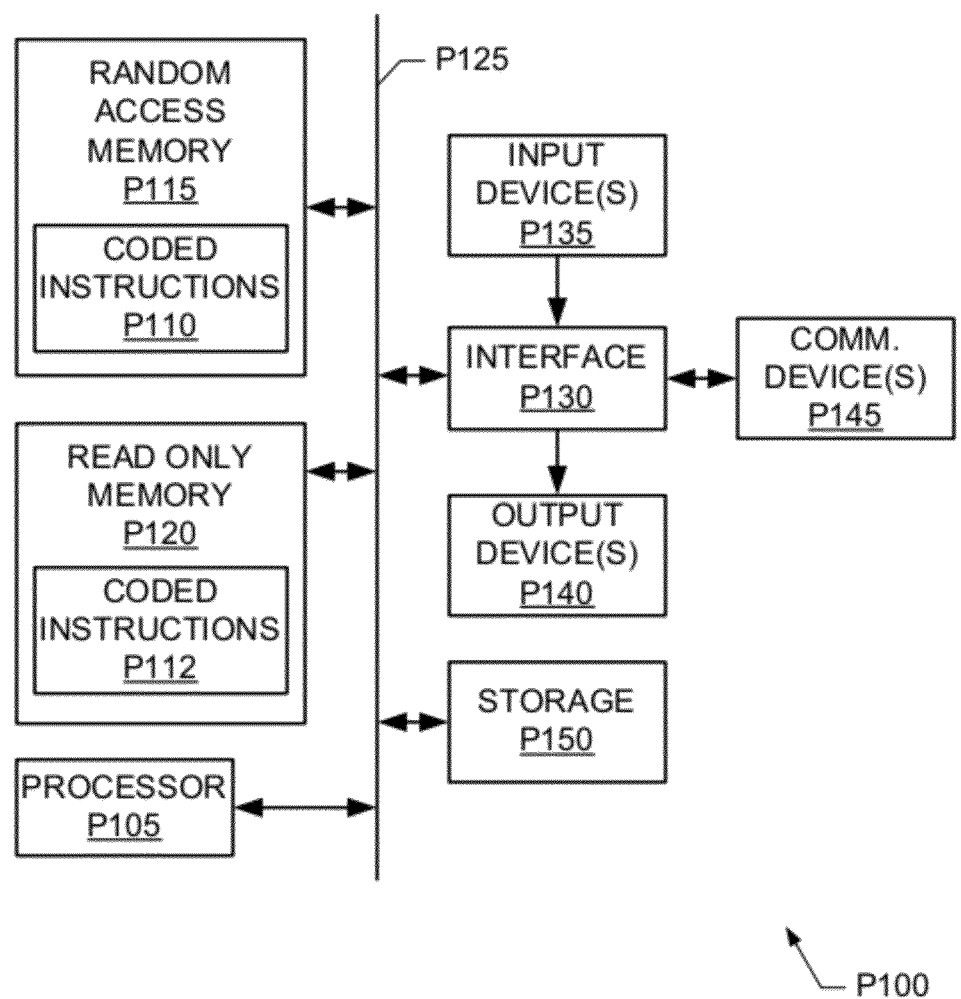
FIG. 4 is a schematic illustration of an example processor platform that may be used and/or programmed to execute the example machine-accessible instructions represented by FIG. 3 to implement a scalable MPLS-based network.

FIG. 4 is a block diagram of an example processor platform P100 that may be used and/or programmed to execute the example instructions of FIG. 4 to implement an ABR (e.g., ABR1-ABR3 and ABR 200 of FIGS. 1 and 2). One or more general-purpose processors, processor cores, microcontrollers, etc may be used to implement the processor platform P100. The processor platform P100 can be, for example, a server, a workstation, a router, a network switch, and/or any other type of computing device containing a processor.

The processor platform P100 of the instant example includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIG. 3 to implement a scalable MPLS-based network. Thus, the coded instructions P110, P112 may include the example instructions of FIG. 3.

The processor P105 is in communication with the main memory including a ROM P110 and the RAM P115 via a bus P125. The RAM P115 may be implemented by Synchronous Dynamic Random Access Memory (SDRAM), Dynamic Random Access Memory (DRAM), RAMBUS Dynamic Random Access Memory (RDRAM) and/or any other type of RAM device. The ROM P110 may be implemented by flash memory and/or any other desired type of memory device. Access to the memory P115 and the memory P120 may be controlled by a memory controller. The example memory P115 and P120 may be used to, for example, store the example OSPF databases 225 and 226 of FIG. 2.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 may be connected to the interface circuit P130. The input device(s) P135 may be used to, for example, permit a user to enter data and commands into the processor P105. The input device(s) P135 can be implemented by, for example, a keyboard, a mouse, a touchscreen, a track-pad, and/or a trackball.

One or more output devices P140 are also connected to the interface circuit 1020. The output devices P140 can be implemented, for example, by display devices (e.g., a liquid crystal display, a cathode ray tube display (CRT), and/or a printer). The interface circuit P130 may, thus, include a graphics driver card.

The interface circuit P130 may also includes one or more communication device(s) 145 such as a network interface card to facilitate exchange of data with external computers via a network. For example, the communication device(s) 145 may implement the example network interfaces 210 and 215 of FIG. 2.

In some examples, the processor platform P100 also includes one or more storage devices P150 to store software and data. Examples of such storage devices P150 include a floppy disk drive, a hard disk drive, a solid-state hard disk drive, a CD drive, a DVD drive and/or any other solid-state, magnetic and/or optical storage device. The example storage 150 may be used to, for example, store the example OSPF databases 225 and 226 of FIG. 2 and/or the example coded instructions of FIG. 3.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method in a hierarchical open shortest path first network including an open shortest path first area zero and a non-zero open shortest path first area, the method comprising:
    determining, at an area border router, an open shortest path first metric representing a cost associated with transporting, within the non-zero open shortest path first area, data between a provider edge router and the area border router;

blocking, at the area border router, a packet used to determine the open shortest path first metric from being distributed in the open shortest path first area zero;

replacing, at the area border router, a first multiprotocol label switching label included in a border gateway protocol message received from the provider edge router with a second multiprotocol label switching label associated with the provider edge router;

replacing, at the area border router, a next-hop attribute included in the border gateway protocol message with a value representing a loopback address of the area border router;

updating, at the area border router, a route cost attribute included in the border gateway protocol message to include the open shortest path first metric; and advertising, from the area border router, the border gateway protocol message into the open shortest path first area zero.

2. The method as defined in claim 1, wherein updating the route cost attribute comprises adding the open shortest path first metric to a previous value of the route cost attribute.

3. The method as defined in claim 1, further comprising blocking the packet at the area border router.

4. A method as defined in claim 1, wherein the area border router is a first area border router, and further comprising:

determining, at the first area border router, a second open shortest path first metric representing a second cost associated with transporting, within the open shortest path first area zero, the data between a second area border router and the first area border router;

replacing, at the first area border router, a third multiprotocol label switching label included in a second border gateway protocol message received from the second area border router with a fourth multiprotocol label switching label associated with the second area border router;

replacing, at the first area border router, a second next-hop attribute included in the second border gateway protocol message with a second value representing a second loopback address of the second area border router;

updating, at the first area border router, a second route cost attribute included in the second border gateway protocol message to include the second open shortest path first metric; and advertising the second border gateway protocol message into the non-zero open shortest path first area.

5. A method as defined in claim 1, wherein the border gateway protocol message is advertised in the open shortest path first area zero via a route reflector.

6. The method as defined in claim 1, wherein the route cost attribute comprises an accumulated interior gateway protocol metric attribute of the modified border gateway protocol message.

7. The method as defined in claim 1, wherein the area border router is configured to operate in the non-zero open shortest path first area and in the open shortest path first area zero.

8. An area border router comprising:
a memory having instructions stored thereon; and
a processor to execute the instructions to perform operations comprising:
determining an open shortest path first metric representing a cost associated with transporting, within a non-zero open shortest path first area of a hierarchical open shortest path first network, data between a provider edge router and the area border router, the hierarchical open shortest path first network including the non-zero open shortest path first area and an open shortest path first area zero;

blocking a packet used to determine the open shortest path first metric from being distributed in the open shortest path first area zero of the hierarchical open shortest path first network; and modifying a border gateway protocol message received from the provider edge router by:
replacing a first multiprotocol label switching label included in the border gateway protocol message with a second multiprotocol label switching label associated with the provider edge router and assigned by the area border router;

replacing a next-hop attribute included in the border gateway protocol message with a value representing a loopback address of the area border router; and updating a route cost attribute included in the border gateway protocol message to include the open shortest path first metric; and advertising the border gateway protocol message into the open shortest path first area zero.

9. The area border router as defined in claim 8, wherein the operations further comprise updating the route cost attribute by adding the open shortest path first metric to a previous value of the route cost attribute.

10. The area border router as defined in claim 8, further comprising using the packet to determine the open shortest path first metric.

11. An area border router as defined in claim 8, wherein the area border router is a first area border router, and the operations further comprise:

determining a second open shortest path first metric representing a second cost associated with transporting, within the open shortest path first area zero, the data between a second area border router and the first area border router;

modifying a second border gateway protocol message received from the second area border router by:
replacing a third multiprotocol label switching label included in the second border gateway protocol message with a fourth multiprotocol label switching label associated with the second area border router;

replacing a second next-hop attribute included in the second border gateway protocol message with a second value representing a second loopback address of the second area border router; and updating a second route cost attribute included in the second border gateway protocol message to include the second open shortest path first metric; and advertising the second border gateway protocol message into the non-zero open shortest path first area.

12. The area border router as defined in claim 8, wherein the border gateway protocol message is advertised in the open shortest path first area zero via a route reflector.

13. The area border router as defined in claim 8, wherein the route cost attribute comprises an accumulated interior gateway protocol metric attribute.

14. The area border router as defined in claim 8, wherein the area border router is configured to operate in in the non-zero open shortest path first area and in the open shortest path first area zero.

15. An area border router as defined in claim 8, further comprising:
a first memory to store a first database including at least one of a first open shortest path first information and a first label distribution protocol information for the non-zero open shortest path first area; and a second memory to store a second database including at least one of a second open shortest path first information and a second label distribution protocol information for the open shortest path first area zero.

16. A tangible machine-readable storage medium comprising machine-readable instructions that, when executed, cause a machine implementing an area border router to perform operations comprising:

determining an open shortest path first metric representing a cost associated with transporting, within a non-zero open shortest path first area of a hierarchical open shortest path first network, data between a provider edge router and the area border router, the hierarchical open shortest path first network including the non-zero open shortest path first area and an open shortest path first area zero;

blocking a packet used to determine the open shortest path first metric from being distributed in the open shortest path first area zero;

replacing a first multiprotocol label switching label included in a border gateway protocol message received from the provider edge router with a second multiprotocol label switching label associated with the provider edge router and assigned by the area border router;

replacing a next-hop attribute included in the border gateway protocol message with a value representing a loopback address of the area border router;

updating at the area border router a route cost attribute included in the border gateway protocol message to include the open shortest path first metric; and advertising border gateway protocol message into the open shortest path first area zero of the hierarchical open shortest path first network.

17. The tangible machine-readable storage medium as defined in claim 16, wherein the operations further comprise updating the route cost attribute by adding the open shortest path first metric to a previous value of the route cost attribute.

18. The tangible machine-readable storage medium as defined in claim 16, wherein blocking the packet is performed at the area border router.

19. The tangible machine-readable storage medium as defined in claim 16, wherein the area border router is a first area border router, the border gateway protocol message is a first border gateway protocol message, and the operations further comprise:

determining a second open shortest path first metric representing a second cost associated with transporting the data between a second area border router and the first area border router within the open shortest path first area zero;

replacing a third multiprotocol label switching label included in a second border gateway protocol message received from the second area border router with a fourth multiprotocol label switching label associated with the second area border router;

replacing a second next-hop attribute included in the second border gateway protocol message with a second value representing a second loopback address of the area border router;

updating a second route cost attribute included in the second border gateway protocol message to include the second open shortest path first metric; and advertising the second border gateway protocol message into the non-zero open shortest path first area.

20. The tangible machine-readable storage medium as defined in claim 16, wherein the route cost attribute comprises an accumulated interior gateway protocol metric attribute of the modified border gateway protocol message.

\* \* \* \* \*